United States Patent

Saurer et al.

[11] Patent Number: 6,047,549
[45] Date of Patent: Apr. 11, 2000

[54] POWER PLANT FACILITY

[75] Inventors: Kurt Saurer, Bergisch Gladbach; Wolfgang Winkler, Winson, both of Germany

[73] Assignee: Gas-, Elektrizitats-und Wasserwerke Koln AG, Koln, Germany

[21] Appl. No.: 09/213,307

[22] Filed: Dec. 16, 1998

[30] Foreign Application Priority Data

Dec. 18, 1997 [DE] Germany .................. 197 56 329

[51] Int. Cl.[7] .................. F01K 13/00; F02C 6/00
[52] U.S. Cl. .................. 60/677; 60/679; 60/39.182
[58] Field of Search .................. 60/39.182, 670, 60/671, 672, 677, 678, 679, 681

[56] References Cited

U.S. PATENT DOCUMENTS

| | | | |
|---|---|---|---|
| 5,370,772 | 12/1994 | Arpalahti et al. | 60/39.182 X |
| 5,428,953 | 7/1995 | Siga et al. | 60/39.182 |
| 5,706,644 | 1/1998 | Nielsen | 60/39.182 X |
| 5,713,195 | 2/1998 | Bronicki et al. | 60/39.182 X |
| 5,737,912 | 4/1998 | Krakowitzer | 60/39.182 X |

FOREIGN PATENT DOCUMENTS

| | | |
|---|---|---|
| 0439754 | 7/1991 | European Pat. Off. |
| 94/02728 | 2/1994 | WIPO |

Primary Examiner—Hoang Nguyen
Attorney, Agent, or Firm—Charles L. Schwab

[57] ABSTRACT

A power plant facility having gas turbines, steam turbines and mixed gas/steam turbines. By use of appropriate networking of the three turbine facilities, an approach to isothermal heat supply and removal is achieved with optimal utilization of waste heat.

21 Claims, 2 Drawing Sheets

POWER PLANT FACILITY

TECHNICAL FIELD

This invention relates to a power plant facility having a first gas-turbine group and, arranged downstream thereof, a first waste-heat boiler, which is in flow connection with a condensing steam turbine.

BACKGROUND OF THE INVENTION

In European patent document EP-A-0 439 754 there is described a power plant facility that has a gas-turbine group having waste-heat boiler and steam turbine ("GuD"=gas and steam turbine process). These processes today achieve electrical efficiencies of up to 58%.

A method of operating a gas turbine described in European patent document EP-B-0 650 554 discloses a mixed gas/steam turbine process in which the injected steam finds use for cooling the combustion chamber. By this means method, the combustion air is no longer required for cooling the combustion chamber, as in conventional gas turbines, but only for controlling the combustion process. For this reason, the ratio of compressor power to turbine power in such mixed gas/steam turbines can be markedly lower than in conventional gas turbines.

A further improvement in heat utilization can be achieved in this process by virtue of the fact that the waste heat of the mixed gas/steam turbine is also partly used for interheating of the steam-unit spent steam supplied to the combustion chamber.

In the processes described, a fact detrimental to the approach to the isothermal combustion power process is that the pressure level declines with the temperature upon the expansion of the working fluid, and so said approach is practically possible only with a few stages. As a consequence, however, substantial elements of the adiabatic combustion power process are preserved.

OBJECTS AND SUMMARY OF THE INVENTION

It is an object of the invention to design a combustion power process in such a fashion that its approach to an isothermal course in a plurality of stages is possible.

This object is achieved by virtue of the fact that the upstream gas and steam turbine process serves as a steam source of a mixed gas/steam turbine process, downstream of which a steam turbine process is arranged. In this way, the heat supply to the overall process by means of the renewed interheating of the spent steam from the upstream gas and steam turbine process can better approach isothermal heat supply than in a gas- and steam-turbine process alone, by which process the thermodynamic average temperature of the actual process of heat supply is markedly increased. The also important isothermal heat removal takes place with the aid of a downstream steam process in condensing operation, which steam process utilizes the waste-heat streams of the mixed gas/steam turbine.

The use of economizers for feedwater preheating also serves to carnotize the steam or gas/steam mixed-turbine processes. Interlacing of the economizers enhances their efficiency.

The constructive cost for final heat recovery is minimized by use of various inlet points into the condensing steam turbine for the various pressures of various steam streams.

By interheating the working fluid in a gas-turbine group having high-pressure and low-pressure sections, an approach to isothermal heat supply is achieved, which approach in combination with off-gas heat utilization effects an improvement in the thermal efficiency. The same holds for the successively arranged mixed gas/steam turbine groups with interheating. Their waste heat is used in a second waste-heat boiler to generate high-pressure steam, which is utilized in a back-pressure turbine in such a way as to boost the efficiency.

By arranging a third mixed gas/steam turbine group, the waste heat of the first and second mixed gas/steam turbine groups is recovered and further heat is furnished for the condensing steam turbine. This turbine utilizes the residual heat of all three waste-heat boilers in the form of steam streams at various pressure levels. The thermal efficiency is also increased by means of these practices. The constructive cost for the power plant facility according to the invention is reduced by virtue of the fact that a low-pressure compressor of the second mixed gas/steam turbine group is arranged as the first stage of a high-pressure compressor of the first mixed gas/steam mixed-turbine group.

Further process stages arranged in "zipper" fashion can be realized, the closure of the chain being formed by the gas/steam turbine group having downstream waste-heat system and condensing steam turbine.

BRIEF DESCRIPTION OF THE DRAWINGS

Further features of the invention can be inferred from the further Claims, the description that follows, and the drawing, in which

DETAILED DESCRIPTION OF THE INVENTION

Figure 1:
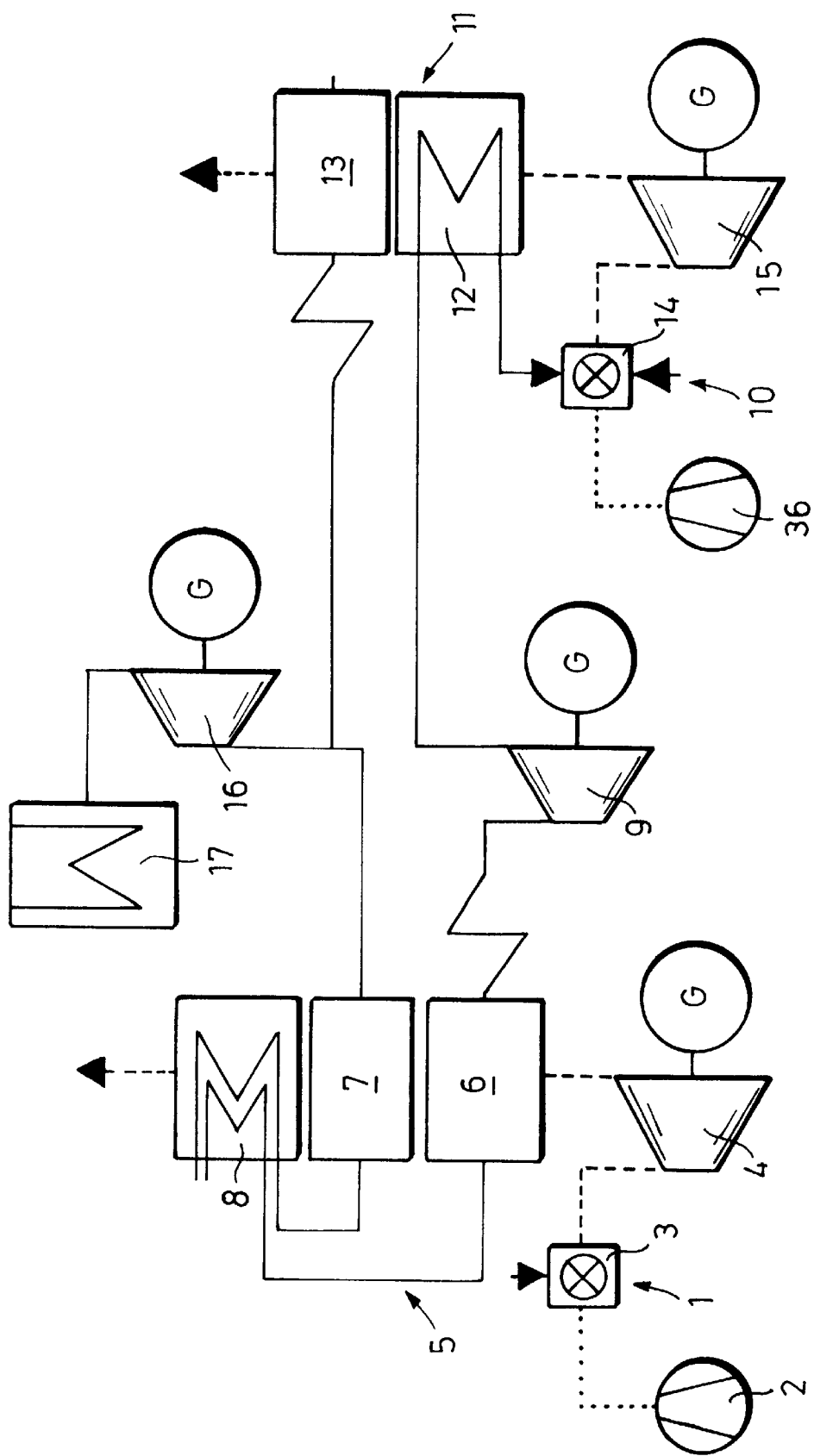
FIG. 1 shows the flow sheet of a power plant facility having one gas-turbine group and one mixed gas/steam turbine group.

The power plant facility of FIG. 1 shows a first gas-turbine group 1 having a compressor 2, a combustion chamber 3 and a gas turbine 4. The first gas-turbine group 1 can also, in departure from FIG. 1, be designed in two stages with interheating, in order to approach isothermal heat supply.

Downstream of the first gas-turbine group 1 is a first waste-heat boiler 5, which has a high-pressure section 6, an intermediate-pressure section 7, which can also be equipped with a superheater, not illustrated, and an economizer unit 8. The last accommodates the stack-gas-heated feedwater preheating of the high-pressure section 6 and of the intermediate-pressure section 7, preferably in interlaced arrangement.

The steam generated in the high-pressure section 6 is expanded in the first back-pressure turbine 9 down to a back pressure that lies somewhat above the combustion-chamber pressure of a first mixed gas/steam turbine group 10.

Arranged downstream of the first mixed gas/steam turbine group 10 is a second waste-heat boiler 11, which contains a superheater 12 and an intermediate-pressure section 13 as heating surfaces. The spent steam of the first back-pressure turbine 9 is conveyed via the superheater 12 to a combustion chamber 14 of the first mixed gas/steam turbine group 10. There it mixes with the combustion gases, cools the combustion chamber 14, and is expanded in a first gas/steam mixed turbine 15 to a pressure slightly higher than atmospheric pressure, in order that the flow losses in the second waste-heat boiler 11 can be compensated. A compressor 36 is connected in compressed air delivery relation to the combustion chamber 14.

The steam generated in the intermediate-pressure section 7 of the first waste-heat boiler 5, with the steam generated in the intermediate-pressure section 13 of the second waste-heat boiler 11, is expanded in a condensing steam turbine 16 and condensed in a condenser 17. The pressure of the intermediate-pressure sections 7, 13 can also be different if this leads to better heat utilization. In such a case, in departure from the situation illustrated in FIG. 1, the higher-pressure steam would be admitted to the condensing steam turbine 16 at the inlet while the lower-pressure steam would be admitted at a point of corresponding pressure.

Figure 2:
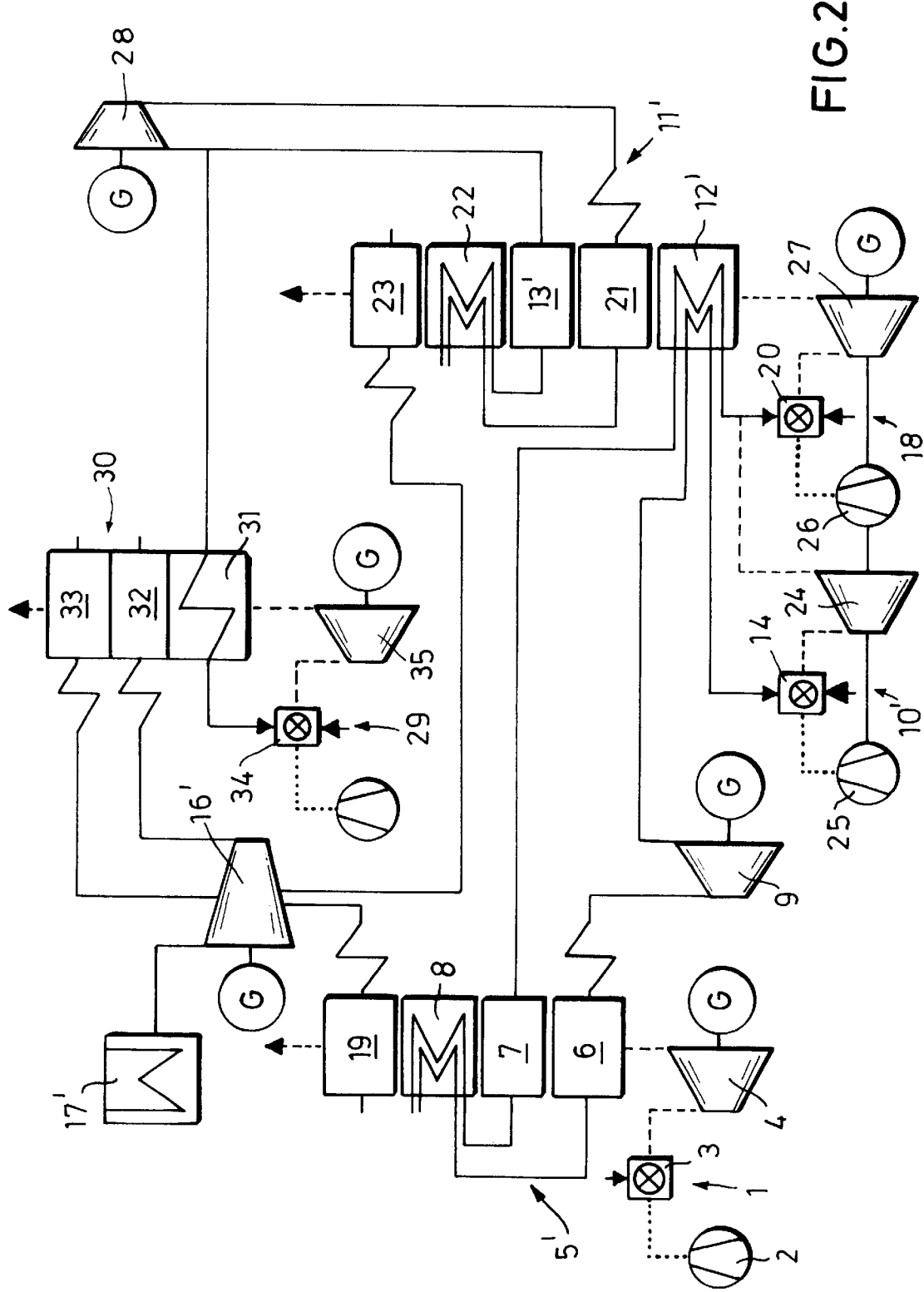
FIG. 2 shows the flow sheet of a power plant facility having one gas-turbine group and two mixed gas/steam turbine groups.

An enlarged power plant facility is shown in FIG. 2. In a second stage, the first mixed gas/steam turbine group 10' is supplemented by a second mixed gas/steam turbine group 18 with interheating.

The first process stage of the power plant facility according to the invention begins with the first gas-turbine group 1, which, as already noted above, can also be designed in departure from the simplified illustration in FIG. 2, preferably with interheating.

Arranged downstream of the first gas-turbine group 1 is a first, enlarged waste-heat boiler 5', which, in addition to the high-pressure section 6, the intermediate-pressure section 7, which here again can be equipped with a superheater, not illustrated, and the economizer unit 8, additionally has a low-pressure section 19. The stack-gas-heated feedwater preheater of the high-pressure section 6 and of the intermediate-pressure section 7, preferably in interlaced arrangement, are located in the economizer unit 8. For the most complete possible heat recovery, the low-pressure section 19 is partly interlaced with the feedwater preheaters of the economizer unit 8 at the end of the first enlarged waste-heat boiler 5'. In accordance with the layout, an arrangement of a superheater belonging to the low-pressure section 19 on the stack-gas side upstream of the economizer unit 8 is also possible.

The steam generated in the high-pressure section 6 of the first enlarged waste-heat boiler 5' is expanded in the first back-pressure turbine 9 to a back pressure that lies somewhat higher than the pressure of the combustion chamber 14 of the first mixed gas/steam turbine group 10'. The steam generated in the intermediate-pressure section 7 exits the first waste-heat boiler 5' at a pressure somewhat higher than the pressure of the combustion chamber 20 of a second mixed gas/steam turbine group 18.

The second process stage of the power plant facility according to the invention begins on the gas side in the successively connected first mixed gas/steam turbine group 10' and the second gas/steam mixed-turbine group 18 with an interheating of the partly expanded off-gases of the first gas/steam turbine group 10'. The off-gas of the second mixed gas/steam turbine group 18 flows through a second enlarged waste-heat boiler 11', which has an interlaced superheater 12', a high-pressure section 21, an intermediate-pressure section 13', which here again can be equipped with a superheater, not illustrated, an interlaced economizer unit 22, and a low-pressure section 23. The combustion chamber 14 of the first mixed gas/steam turbine group 10' is charged with the spent steam of the first back-pressure turbine 9, which is superheated to the greatest possible degree in the interlaced superheater 12'. The quantity of air required for nearly stoichiometric combustion in the combustion chamber 14 is supplied by a high-pressure compressor 25. The combustion chamber 20 of the second mixed gas/steam turbine group 18 is charged with the partly expanded stack-gas/steam mixture of the first mixed gas/steam turbine group 10', the intermediate-pressure steam generated in the intermediate-pressure section 7 and superheated in the superheater 12', and the combustion air delivered by a low-pressure compressor 26.

Given an appropriate layout, it is possible to adapt the spent-steam pressure of the back-pressure turbine 9 to the pressure level of the intermediate-pressure section 7 and thus, in place of the mixed gas/steam turbine groups 10' and 18, to combine into a single machine.

On the other hand, it is also possible to place the low-pressure compressor 26 and the high-pressure compressor 25 in one housing in order to reduce the construction cost.

In a second mixed gas/steam turbine 27 of the second mixed gas/steam turbine group 18, which functions as a low-pressure turbine, the stack gas is expanded to the final pressure, which is less than atmospheric pressure by the stack-gas-side pressure loss of the downstream second enlarged waste-heat boiler 11'.

In the high-pressure section 21 of the second enlarged waste-heat boiler 11', high-pressure steam is generated for a second back-pressure turbine 28. This turbine expands the high-pressure steam to the pressure level of the intermediate-pressure section 13' of the second enlarged waste-heat boiler 11'.

The third process stage of the power plant facility according to the invention begins on the gas side with a third mixed gas/steam turbine group 29, downstream of which is a third waste-heat boiler 30. This waste-heat boiler exhibits a superheater 31, an intermediate-pressure section 32 and a low-pressure section 33. The spent steam of the second back-pressure turbine 28 and the steam from the intermediate-pressure section 13' are superheated in the superheater 31 and conveyed to the combustion chamber 34 of the third mixed gas/steam turbine group 29. There also, the steam for cooling the combustion chamber is utilized in a nearly stoichiometric combustion and is expanded in a mixed gas/steam turbine 35 of the third mixed gas/steam turbine group 29, together with the combustion off-gas formed in the combustion chamber 34, to a pressure lying slightly above atmospheric pressure, so that the stack-gas-side pressure losses of the third waste-heat boiler 30 can be compensated.

The condensing steam turbine 16' serves as the fourth process stage. This turbine has various steam inlets for the various pressure levels of the individual steam streams. As a general rule, the steam from the intermediate-pressure section 32 of the third waste-heat boiler 30 will exhibit the highest pressure, while the pressure of the steam streams from the low-pressure section 19, the low-pressure section 23 and the low-pressure section 33 is lower. The low-pressure section 23 can be arranged in a way comparable to what was described for the low-pressure section 19. After the expansion of the steam in the condensing steam turbine 16', the steam is condensed in the condenser 17'.

An advantageous development of the invention, which is, however, not illustrated, consists in that the third process stage is effected by provision of a third gas/steam mixed turbine group with interheating. All that has to be done here is to adapt the pressure level of the spent steam of the second back-pressure turbine 28 to the pressure of the high-pressure combustion chamber and to adapt the pressure of the intermediate-pressure section 13' to the pressure of the low-pressure combustion chamber. In this way, further process stages can be implemented similarly to a "zipper" system. The closure of the chain is formed by the third waste-heat boiler 30 and the condensing steam turbine 16' with condenser 17'.

If there is a need for process heat or district heating, the low-pressure sections 19, 23 and 33 can be adapted and/or omitted in such a way that the off-gas streams of the waste-heat boilers 5', 11' and 30 are employed for extracting these quantities of available heat. The condensing turbine 16' can then be designed as a back-pressure turbine and/or the condenser 17' can be designed as a heating condenser.[1]

An advantageous embodiment of the invention consists in that the combustion chambers 3, 14, 20, 34 of the gas turbines are replaced by high-temperature fuel cell modules, so as to serve as heat sources for the gas turbines. The efficiency of the facility is enhanced in this way.

What is claimed is:

1. A power plant facility having gas and steam processes, comprising:
    a first gas turbine group (1),
    a first back pressure turbine (9),
    a condensing steam turbine (16),
    a first waste-heat boiler (5) connected in off-gas receiving relation to said first gas turbine group (1) including
        a high pressure section (6) connected in steam delivery relation to said first back pressure turbine (9) and
        an intermediate pressure section (7) connected in steam delivery relation to said condensing steam turbine (16),
    a first mixed gas/steam turbine group (10) including a combustion chamber (14),
    a second waste-heat boiler (11) including a superheater (12) connected in off-gas receiving relation to said first mixed gas/steam turbine group (10) and
    a flow connection between said first back pressure turbine (9) and said combustion chamber (14) via said superheater (12) whereby spent steam from said back pressure turbine (9) is subjected to interstage superheating in said superheater (12) in route to said combustion chamber (14).

2. The power plant facility of claim 1 wherein said second waste-heat boiler (11) includes an intermediate pressure section (13) connected in steam delivery relation to said condensing steam turbine (16).

3. The power plant facility of claim 1 and further comprising an economizer unit (8) in off-gas down stream relation to said high pressure and intermediate pressure sections (16,7) of said first waste-heat boiler (5), said economizer unit (8) including a first feedwater preheater connected in feedwater delivery relation to said intermediate pressure section (7) of said first waste-heat boiler (5) and a second feedwater preheater connected in feedwater delivery relation to said high pressure section (6) of said first waste-heat boiler (5).

4. The power plant facility of claim 3 wherein said feedwater preheaters are interlaced.

5. The power plant facility of claim 3 wherein said second waste-heat boiler (11) includes an intermediate pressure section (13) connected in steam delivery relation to said condensing steam turbine (16).

6. The power plant facility of claim 5 wherein said feedwater heaters are interlaced.

7. The power plant facility of claim 2 wherein said intermediate pressure section (7) of said first waste-heat boiler (5) and said intermediate pressure section (13) of said second waste-heat boiler (11) have different steam pressures and are connected to correspondingly different points of admission into said condensing steam turbine (16).

8. The power plant facility of claim 1 wherein said first gas turbine group (1) is a two-stage design with interheating.

9. A power plant facility having gas and steam processes, comprising:
    a first gas turbine group (1),
    a first back pressure turbine (9),
    a condensing steam turbine (16'),
    a first waste-heat boiler (5) connected in off-gas receiving relation to said first gas turbine group (1) including
        a high pressure section (6) connected in steam delivery relation to said first back pressure turbine (9),
        an intermediate pressure section (7) and
        a low pressure section connected in steam delivery relation to condensing steam turbine (16'),
    a first mixed gas/steam turbine group (10') including a combustion chamber (14),
    a second mixed gas/steam turbine group (18) including a combustion chamber (20),
    a second waste-heat boiler (11') connected in off-gas receiving relation to said second mixed gas/steam turbine group (18) including a superheater (12'),
    said first back pressure turbine (9) being connected via said superheater (12') in spent steam delivery relation to said combustion chamber (14) of said first mixed gas/steam turbine group (10') and
    said intermediate pressure section (7) of said first waste-heat boiler (5') being connected via said superheater (12') in steam delivery relation with said combustion chamber (20) of said second mixed gas/steam turbine group (18).

10. The power plant facility of claim 9 wherein said combustion chamber (20) of said second mixed gas/steam turbine group (18) is connected in off-gas receiving relation to said first mixed gas/steam turbine group (10').

11. The power plant facility of claim 9 and further comprising a second back pressure turbine (28) and wherein said second waste heat boiler (11') includes a high pressure section (21) connected in steam delivery relation to said second back pressure turbine (28).

12. The power plant facility of claim 9 wherein said first mixed gas/steam turbine group (10') includes a high pressure compressor (25) and said second mixed gas/steam turbine group (18) includes a low pressure compressor (26) connected in compressed air delivery relation to said high pressure compressor (25).

13. The power plant facility of claim 9 wherein said second waste-heat boiler (11') includes a section connected in steam delivery relation to said condensing steam turbine (16').

14. The power plant facility of claim 13 wherein said condensing steam turbine is a multi-stage condensing steam turbine and wherein said steam from said first and second waste-heat boilers (5', 11') is delivered to said condensing steam turbine (16') at points corresponding to the steam pressure level.

15. The power plant facility of claim 9 wherein said second waste-heat boiler (11') includes a high pressure section (21) and an intermediate pressure section (13') and further comprising a second back pressure turbine (28) connected in steam receiving relation to said high pressure section (21) of said second waste-heat boiler (11'), a third mixed gas/steam turbine group (29) including a combustion chamber (34) and a third waste-heat boiler (30) including a superheater (31), said combustion chamber (34) being connected in spent steam receiving relation with said second back pressure turbine (28) and in steam receiving relation with said intermediate pressure section (13') of said second waste-heat boiler (11').

16. The power plant facility of claim 15 wherein said spent steam from said second back pressure turbine (28) delivered to said combustion chamber (34) is routed through and heated to an elevated temperature by said superheater (31) of said third waste-heat boiler (30).

17. The power plant facility of claim 16 wherein said steam delivered from said intermediate pressure section (13') of said second waste-heat boiler (11') to said combustion chamber (34) of said third mixed gas/steam turbine group (29) is routed through said superheater (31) of said third waste-heat boiler (30).

18. The power plant facility of claim 15 wherein said third waste-heat boiler (30) includes a low pressure section (33) connected in steam delivery relation to said condensing steam turbine (16').

19. The power plant facility of claim 15 wherein said second waste-heat boiler (11') includes a low pressure section (23) connected in steam delivery relation to said condensing steam turbine (16') and said third waste-heat boiler (30) includes a low pressure section (33) connected in steam delivery relation to said condensing steam turbine (16').

20. The power plant facility of claim 19 and further comprising a heating condenser (17') in spent gas receiving relation to said condensing steam turbine (16').

21. The power plant facility of claim 15 wherein said first gas turbine group (1) includes a combustion chamber (3) and wherein said combustion chambers (3,14,20,34) are high temperature fuel modules serving, respectively, as heat sources for said turbine groups (1, 10', 18 30).

* * * * *